(12) United States Patent
Al Ghatta et al.

(10) Patent No.: US 6,403,728 B1
(45) Date of Patent: Jun. 11, 2002

(54) FORMED ARTICLES FROM POLYESTER RESINS

(75) Inventors: Hussain Ali Kashif Al Ghatta, Fiuggi; Tonino Severini, Colleferro; Sandro Cobror, Napoli, all of (IT)

(73) Assignee: Sinco Engineering, S.p.A. (IT)

( * ) Notice: Subject to any disclaimer, the term of this patent is extended or adjusted under 35 U.S.C. 154(b) by 0 days.

(21) Appl. No.: 09/516,575

(22) Filed: Mar. 1, 2000

Related U.S. Application Data

(63) Continuation of application No. 08/535,032, filed as application No. PCT/EP94/01367 on Apr. 29, 1994, now abandoned.

(30) Foreign Application Priority Data

May 7, 1993 (IT) ........................ MI93A00916

(51) Int. Cl.[7] .................... C08L 67/02; C08K 3/40; C08G 63/16
(52) U.S. Cl. .................. 525/444; 528/308; 528/308.3; 528/491; 524/494
(58) Field of Search ................ 524/494; 528/308, 528/308.2, 491, 308.3; 525/444

(56) References Cited

U.S. PATENT DOCUMENTS

| | | | | |
|---|---|---|---|---|
| 3,553,157 A | | 1/1971 | Dijkstra | |
| 4,223,125 A | * | 9/1980 | Bier et al. | 528/308.2 |
| 4,436,877 A | * | 3/1984 | Kasuga et al. | 528/308.2 |
| 4,446,303 A | * | 5/1984 | Moore et al. | 528/308.2 |
| 4,742,151 A | * | 5/1988 | Tate et al. | 528/308.2 |
| 4,755,587 A | * | 7/1988 | Rinehart | 528/272 |
| 5,243,020 A | * | 9/1993 | Ghisolfi | 528/272 |
| 5,266,658 A | * | 11/1993 | Dashevsky et al. | 525/444 |
| 5,334,669 A | * | 8/1994 | Ghisolfi | 528/302 |
| 5,338,808 A | * | 8/1994 | Ghisolfi | |
| 5,376,734 A | * | 12/1994 | Al Ghatta | |
| 5,408,035 A | * | 4/1995 | Duh | 528/308.2 |

FOREIGN PATENT DOCUMENTS

| | | |
|---|---|---|
| EP | 0 281 496 | 9/1988 |
| EP | 0 422 282 | 4/1991 |
| FR | 2 250 782 | 6/1975 |

* cited by examiner

*Primary Examiner*—Tae H. Yoon
(74) *Attorney, Agent, or Firm*—Cook, Alex, McFarron, Manzo, Cummings & Mehler, Ltd.

(57) ABSTRACT

Articles from a polyester resin obtained by melt-shaping of the resin added with a polyfunctional compound, capable of increasing the molecular weight of the resin by addition reaction in the solid state with the end groups of the resin and by upgrading treatment of the article, so as to increase by at least 0.1 dl/g the intrinsic viscosity of the starting resin.

13 Claims, No Drawings

FORMED ARTICLES FROM POLYESTER RESINS

This application is a continuation of U.S. application Ser. No. 08/535,032 filed on Dec. 12, 1995 now abandoned, which is a 371 of PCT/EP94/01367 filed Apr. 29, 1994.

BACKGROUND OF THE INVENTION

The present invention relates to a new process for the preparation of articles formed of polyester resins endowed with valuable mechanical and impact strength properties.

Polyester resins because of their favourable mechanical properties have wide application in the preparation of fibres and films. The resins utilized for this application have values of intrinsic viscosity generally between 0.6 and 0.8 dl/g.

Polyester resins are also used in blow-molding or extrusion-molding processes for the production of bottles and similar thin walled containers.

The resins used in blow molding processes typically have a sufficiently high intrinsic viscosity to allow the realization of the injection operation.

The viscosity suitable for these applications is generally between 0.7–0.8 dl/g and is obtained by solid state upgrading treatments.

For the molding of articles with thick walls or with large dimensions, it is necessary to use resins with a not very high molecular weight to maintain the viscosity in the melt at values suitable for the molding process.

The mechanical properties of the articles thus obtained are not satisfactory, because of the low molecular weight of the resin.

Previously has been tried to obviate this difficulty by carrying out the molding process in the presence of small quantities of polyfunctional compounds blended in the molten resin, which are capable of reacting with the resin end groups to increase the molecular weight of the same.

The use of these polyfunctional compounds results in molded articles in which the polymer has sufficiently high values of intrinsic viscosity to ensure good mechanical properties and impact strength.

Carrying out this process, however, is a difficult operation because of the necessity of using a melt with a relatively high viscosity.

Moreover, it is difficult to control the process and to obtain formed articles with reproducible properties because of the complex reactions which occur in the melt.

It is therefore desirable to have molding processes of easy realization which result in formed articles having high mechanical properties.

A process has now been unexpectedly found for a melt-shaping polyester resins, which results in formed articles endowed of valuable mechanical properties by using in the shaping phase a melt having a not too high viscosity so as to prevent an easy resin processability.

DETAILED DESCRIPTION OF THE PRESENTLY PREFERRED EMBODIMENTS

The process of the present invention comprises a first phase in which a melt polyester resin mixed with an upgrading polyfunctional compound capable of increasing the molecular weight of the resin by addition reactions in the solid state with the resin end groups, is melt-shaped under temperature and duration conditions and at concentrations of the upgrading compound such as to avoid increasing the intrinsic viscosity to values greater than about 1.0 dl/g, and a second phase in which the formed article is subjected to an upgrading reaction in the solid state so as to increase the intrinsic viscosity at least 0.1 dl/g with respect to the polymer viscosity before the upgrading treatment.

Preferably, the resin used in the melt-shaping step has an intrinsic viscosity higher than 0.4 dl/g but generally lower than 1.0 dl/g.

The polymer intrinsic viscosity in the manufactured article has values higher than about 0.7 dl/g and generally between 0.7 and 1.8 dl/g.

It has been unexpectedly found that the polymer in the formed articles, having the above intrinsic viscosity, shows particularly high mechanical properties such as tensile strength and resiliency, higher than those of a polymer upgraded with a process different from that of the invention.

Particularly high mechanical properties especially high notched impact strength are shown by the glass reinforced articles.

The invention process is particularly suitable for the preparation of formed articles such as films, panels, plates sheets and generally thick-walled articles.

For the upgrading reaction in the solid state, a thermal treatment is carried out on the formed article, at temperatures higher than about 130° C. and lower than the melting point of the resin.

The treatment duration, the temperature and the concentration of the upgrading additive are selected so as to obtain an increase of intrinsic viscosity of at least 0.1 dl/g in comparison with the intrinsic viscosity of the starting polymer used in the melt-shaping step. The upgrading reaction is carried out in an inert gas stream, such as nitrogen, carbon dioxide or, if necessary, under vacuum.

Regarding the films, the mechanical properties are considerably improved if the upgrading treatment is carried under stretch. The utilizable stretching ratios are generally between 1:2 and 1:8.

The polyester resins used in the process of the present invention include products of polycondensation of aromatic bicarboxylic acids such as terephthalic acid or its esters such as dimethylterephthalate, naphthalenbicarboxylic acids, 5-ter butyl-1,3-benzendicarboxylic acids with glycols with 2–10 carbon atoms such as ethylene glycol, 1.4-cyclohexanediol, 1.4 butanediol, hydroquinone.

Polycondensation products are also comprised containing, besides the units deriving from terephthalic acid or its esters, up to 25% of all acid units, units deriving from bicarboxylic acids such as isophthalic and orthophtalic acid. Polyethyleneterephthalate and polybutyleneterephthalate are the preferred resins.

The polyester resin can be added with other compatible polymers such as polycarbonates, elastomeric polyesters and polycaprolactone in amounts up to 20% by weight. Recycled polyester can also be used.

It has been found, and it is another aspect of the invention, that the addition of up to 5% by weight of compounds or polymers having properties of liquid crystals and containing groups reactive with the upgrading compounds, such as the OH and $NH_2$ groups improves the mechanical properties (elastic modulus) of the formed articles (films) subjected to upgrading under stretch. An example of polymer liquid crystals is the product sold by Hoechst Celanese under the trade mark TLCP Vectra A 950.

The upgrading additives usable in the process of the present invention lead to the increase of the resin molecular weight by addition reactions in the solid state, with the end groups of the polyester resin. The additives are used in amount from about 0.05 to 2% by weight on the resin.

Dianhydrides of tetracarboxylic aromatic acids are the preferred additives. The dianhydride of pyromellitic acid is the preferred compound. Other representative dianhydrides are those of 3.3', 4.4'-benzophenone-tetracarboxy and, 2,2-bis (3,4 dicarboxylphenyl) propane acid, 3.3'-4.4'-biphenyltetracarboxy acid, bis (3.4 dicarboxyphenyl) propane acid 3.3'-4.4'-biphenyltetracarboxy acid, bis (3,4 dicarboxyphenyl) ether, bis (3,4 dicarboxyphenyl) sulfone and their mixtures.

Dianydrides of aliphatic tetracarboxylic acids are also suitable. Examples of these dianydrides are the dianydride of 1,2,3,4 cyclobutanetetracarboxylic acid and 2,3,4,5 tetracarboxyhydrofuran acid.

The blending of the resin with the additive is preferably carried out in a mono or twin screw extruder at a temperature of between 200° and 350° C.

A counter rotating not intermishing twin screw extruder is preferred.

The extruded polymer is subsequently pelletized and subjected to the shaping process.

The resin is melt-shaped according to the techniques including extrusion blow molding, blow molding, injection-extrusion, extrusion to form sheets, tubes.

Conventional additives can be blended in the polyester. Such additives include stabilizers, antioxidants, plasticizers pigments, nucleant agents, antiflame compounds, inert or reinforcing fillers such as glass fibers.

In general, the addition of the glass fibers improves the notched impact strength, initial flexural modulus and breaking stress of the articles obtained with the process of the present invention. The use of as a little as 5% by weight of glass fibers is sufficient to increase these properties. Concentrations as high as 60% or higher can be used. Preferred concentrations are from 10 and 40% by weight.

The glass fibers are preferably 0.2 to 1 mm in length.

The glass fibers can be added to the composition in any suitable manner. For example they may be incorporated into the polyester resin before the upgrading compound is added or the molten resin, the glass fibers and the upgrading compound are mixed in an extruder. Preferably, the glass fibres are added to the polyester resin premixed with melt with the upgrading compound, the residence time of the resin in the shaping apparatus is lower than 2 minutes, preferably comprised between 20 and 100 seconds, and the barrel temperature is lower than about 300° C. and higher than the melting point of the resin. PET is the preferred resin for preparing glass fibers reinforced articles. The glass reinforced resins are particularly suitable for preparing food containers for dual ovenable applications or for any other application involving heat treatment.

The following examples are given to illustrate but not to limit the invention.

EXAMPLE 1

Polybutylenterephtalate having an intrinsic viscosity of 0.587 dl/g added respectively with 0.3% and 0.5% by weight of pyromellitic dianhydride (PMDA) (respectively polymer A and polymer B) is extruded in a counter rotating twin screw extruder Haake Rheocord 90 Fison to obtain chips with a dimater of about 3 mm and a length of 5 mm.

The polymer not added of PMDA (Polymer C) is extruded in the same way.

The intrinsic viscosity after extrusion was:
Polymer A IV=0.599 dl/g
Polymer B IV=0.616 dl/g
Polymer C IV=0.580 dl/g The chips were then extruded in a mono screw extruder with filming head to mold a film with thickness of about 0.37 mm that is then subjected to an upgrading thermal treatment at 180° C. for 64 h, under vacuum.

The polymer intrinsic viscosity in the three different films after upgrading was:
Film A IV=1.807 dl/g
Film B IV=1.605 dl/g
Film C IV=0.821 dl/g Mechanical tests carried out on film samples have given following results:

|  | FILM | | |
|---|---|---|---|
|  | A | B | C |
| Stress at peak MPa | 58 | 66 | 30 |
| Stress at break MPa | 50 | 62 | 22 |
| Strain at break % | 6.1 | 11.2 | 5.2 |
| Elastic modulus MPa | 950 | 975 | 967 |
| Energy at break J | 0.0128 | 0.0357 | 0.005 |

EXAMPLE 2

Films extruded according to example 1 were subjected to upgrading treatment at 170° C. for 4 h under vacuum.

The polymer intrinsic viscosity in the films was: (in parenthesis is reported the I.V. of the films before upgrading).
Film A I.V.=0.74 dl/g (0.60 dl/g)
Film B I.V.=0.77 dl/g (0.63 dl/g)
Film C I.V.=0.74 dl/g (0.57 dl/g)

Mechanical tests carried out on film samples have given following results:

|  | FILM | | |
|---|---|---|---|
|  | A | B | C |
| Stress at peak MPa | 58 | 59 | 57 |
| Stress at break MPa | 50 | 62 | 22 |
| Strain at break % | 6.1 | 11.2 | 5.2 |
| Elastic modulus MPa | 950 | 975 | 967 |
| Energy at break J | 0.0128 | 0.0357 | 0.005 |

EXAMPLE 3

Films from polyethylenterephthalate (PET) chips having I.V.=0.642 dl/g and added with 0.5% of PMDA were obtained operating in conformity with example 1. One film was heated and stretched with a speed of 10 mm/min from 25 to 230° C. under nitrogen and 1 bar of pressure and maintained under constant load of 30N between 180 and 230° C. for 30 min.

The stress at break, the strain at break and the elastic modulus of film were respectively 147.5 MPa, 8.6% and 4700 MPa. These values were of 67.5 MPa, 8.9% and 946 MPa for the film not subjected to upgrading/stretching and treatment.

The I.V. of the polymer with film before and after upgrading respectively was of 0.64 and 0.80 dl/g The determination of the mechanical properties were carried out according to ASTM D-638.

The intrinsic viscosity was determined in a solution at 60/40 by weight of phenol and tetrachlorethane, operating at 25° C.

EXAMPLE 4

10 Kg/h of a mixture of 99.5% by weight of crystalline PET having I.V.=0.642 dl/g and 0.5% by weight of liquid crystals TLCP Vectra A 950 (Hoechst Celanese) previously vacuum dried at 140° C. for 10 h and then added with 0.3% by weight of PMDA was fed into a counter rotating not intermeshing twin screw extruder and then pelletized.

The extrusion conditions are as follows:

Screw ratio (L/D): 36

Screw rotation speed: 145 rpm

Barrel temperature: 260° C.

Die type: round with 3 mm diameter

5 Kg/h of the so obtained chips were fed into a mono screw extruder provided with a flat die suitable for cast film production.

The extrusion conditions were as follows:

Screw ratio L/D=28

Screw rotation speed=80 rpm

Barrel temperature=265° C.

Head temperature=275° C.

Samples of 40 mm length were cut from the so obtained film and tested with an INSTRON tensile Tester (Mod. 4505) having a heating chamber.

Operating under nitrogen at 190° C. for 30 min, the samples were stretched with a rate of 1 mm/min so as to obtain a lengthening of twice the original length.

The obtained samples (not less than 5) were then subjected to the measuring of the tensile properties (elastic modulus, stress at break and at peak).

The determinations were carried out according to ASTM D-882 using an INSTRON tensile Tester (Mod. 4505).

The obtained results are shown in table 1, where are indicated also the film data obtained under the conditions of this example 4 from chips prepared from mixtures of:

99.5% by weight of crystalline PET (IV=0.61 dl/g) and 0.5% by weight of TLCP Vectra A 950 (Hoechst Celanese) (comparative example 1)

99.7% by weight of crystalline PET (IV=0.61 dl/g) and 0.3% by weight of PMDA (comparative test 1 of Example 4) and from crystalline PET (IV=0.61 dl/g); (comparative example 2)

TABLE 1

| PRODUCT | MECHANICAL PROPERTIES | | |
|---|---|---|---|
| | Modulus (MPa) | Tensile strength (MPa) | Strain at break % |
| Ex. 4 | 4520 | 58 | 9 |
| Cmp. 1 | 2562 | 94 | 13 |
| Tex. 1-Ex. 4 | 2624 | 93 | 47 |
| Cmp. 2 | 1637 | 62 | 50 |
| LCP Vectra A 950 | 38000 | 138–241 | 1–3 |

The elastic modulus values expected for films obtained from mixtures according to example 4 and comparative 1, in the hypothesis of perfect adhesion between LCP and the polyester matrix, are respectively of 2770 and 1790 MPa.

EXAMPLE 5

30 Kg/h of polyethylene terephthalate (PET) with a melting point of 253° C. and intrinsic viscosity of 0.66 dl/g are continuously fed from the polycondensation section in the melt state of PET to counterrotating and not intermeshing twin screw extruder of mm 30 in diameter, equipped with a device for outgassing.

590 g/h of a blend 20% in weight of pyromellitic dyanidride (PMDA) in crystallized powdered PET (IV-0.64 dl/g) are continuously fed to an extruder using a gravimetric feeder.

The test conditions are the following:

Pyromellitic dyanidride in melt=0.4% weighting

Screw speed=415 RPM

Length/Diameter ratio of the screw=24

Average residence time=18–25 sec.

Cylinder temperature=283° C.

Melt temperature=290° C.

A mold with a doble hole is used for the extrusion (diameter—7 mm)

A strand pelletizer is used to obtain granules with a cylinder shape having 3 mm as diameter and 5 mm as length. The intrinsic viscosity of the granules is 0.64–0.65 dl/g.

10 Kg/h of these granules are fed, after drying in a counterrotating twin screw extruder, 70 mm in diameter, L/D ratio equal to 32.

After the melting of the polymer (12 L/D) the requested amount of glass fibres was fed by a lateral feeder. The remaining 20 L/D length of the extruder was used to mix PET and glass fibres.

Residence time in the extruder was 60–90 seconds at 270° C. The product was extruded through a 750 mm wide flat die and then gathered on 3 cooled rolls.

An additional natural cooling bench was used to stabilize the formed sheets.

Then a part of the sheets was subjected to upgrading at 190° C. in vacuum for 12 h.

Mechanical characterization has been carried out on sheets after the extrusion and after the upgrading treatment.

The data of the upgraded sheets are reported in the following table:

TABLE 2

| Composition | I.V. dl/g | Tensile modulus (GPa) | 120 D impact strength (J/m) |
|---|---|---|---|
| PET | | 3.4 | |
| PET + 0.4 PMPA | | 3.5 | |
| PET + 20% fibres glass | 0.850 | 4.9–8.7 (*) | 80 |
| PET + 30% fibres glass | 0.920 | 6–11 (*) | 90 |
| PET + 40% fibres glass | 0.95 | 6.4–13.8 (*) | 117 |

(*) The higher value is referred to the direction of extrusion: the lower value to an orthogonal direction.

Tensile tests have been carried out using an Instron machine Series 4500 operating at 10 mm/min under room conditions on specimens cut out from original sheets. At least 5 specimens for each sample have been tested.

A dynamic extensometer (12.5 mm) has been used to avoid samples slipping between the clamps.

Impact properties have been checked using an Isod impact taster Ceast using a 2 J hammer and notched specimens cut out from original sheets. At least 5 specimens for each sample were be tested.

EXAMPLE 6

Results similar to those reported in Example 5 were obtained for the glass fibres reinforced sheets obtained from PET scraps having I.V.=0.62 dl/g and melting point of 253° C.

What is claimed is:

1. A process for preparing articles from polyester resins comprising the steps of:

melt-shaping a resin having an intrinsic viscosity higher than 0.5 dl/g and lower than about 1.0 dl/g, mixed with an upgrading additive selected among the dianhydride of tetacarboxylic acids; and upgrading the shaped article at temperatures higher than 130° C. but lower than the resin melting point under vacuum or in an inert gas stream for a time of 4 to 64 hours to raise the resin intrinsic viscosity at least 0.1 dl/g with respect to the value of the intrinsic viscosity of the resin before the upgrading treatment.

2. A process according to claim 1 wherein the polyester resin is polybutylenterephthalate.

3. A process according to claim 1 wherein the intrinsic viscosity of the polymer in the formed article after said upgrading treatment is higher than 0.8 dl/g.

4. A process according to claim 1 further comprising the step of glass fiber reinforcing the articles to include from 10 to 50% by weight of glass fibers.

5. A process according to claim 1 wherein the resin is added with up to about 5% by weight of a compound or polymer with properties of liquid crystal.

6. A process according to claim 1 wherein the upgrading is achieved with pyromellitic anhydride.

7. A process according to claim 2, wherein the article is a film.

8. A process according to claim 1 wherein the article is subjected to upgrading under stretching.

9. A process according to claim 1 wherein the intrinsic viscosity of the polymer in the formed article after said upgrading treatment is higher than 1.0 dl/g.

10. A process according to claim 1 wherein said upgrading treatment includes subjecting the shaped article to a solid state polycondensation treatment.

11. A process according to claim 2 wherein the intrinsic viscosity of the polymer in the formed article after said upgrading treatment is higher than 0.8 dl/g.

12. A process according to claim 2 wherein the intrinsic viscosity of the polymer in the formed article after said upgrading treatment is higher than 1.0 dl/g.

13. A process for preparing films from polyester resins comprising the steps of:

melt-shaping a resin having an intrinsic viscosity higher than 0.5 dl/g and lower than about 1.0 dl/g, mixed with an upgrading additive selected among the dianhydride of tetacarboxylic acids; and upgrading the film under stretching at temperatures higher than 130° C. but lower than the resin melting point under vacuum or in an inert gas stream to raise the resin intrinsic viscosity at least 0.1 dl/g with respect to the value of the intrinsic viscosity of the resin before the upgrading treatment.

* * * * *